US006908692B1

(12) United States Patent
Böhm et al.

(10) Patent No.: US 6,908,692 B1
(45) Date of Patent: Jun. 21, 2005

(54) COATING COMPOSITION FOR METALLIC CONDUCTORS AND COATING METHOD USING SAME

(75) Inventors: Frank-Rainer Böhm, Odenthal (DE); Gerhard Kiessling, Hattingen (DE); Manfred Oppermann, Wuppertal (DE); Heinz Schindler, Ratingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,999

(22) PCT Filed: Mar. 1, 2000

(86) PCT No.: PCT/EP00/01720

§ 371 (c)(1),
(2), (4) Date: Aug. 20, 2001

(87) PCT Pub. No.: WO00/54286

PCT Pub. Date: Sep. 14, 2000

(30) Foreign Application Priority Data

Mar. 6, 1999 (DE) ........................................ 199 09 954

(51) Int. Cl.[7] ................................................ B32B 15/02

(52) U.S. Cl. ....................... 428/632; 428/630; 428/633; 428/639; 428/640; 428/641; 428/689

(58) Field of Search ................................. 428/630, 632, 428/633, 639, 640, 641, 689; 524/378, 265, 493, 497

(56) References Cited

U.S. PATENT DOCUMENTS

| | | | | | |
|---|---|---|---|---|---|
| 3,923,731 | A | | 12/1975 | MacKenzie | |
| 3,986,993 | A | * | 10/1976 | Vassiliou | 524/249 |
| 4,461,786 | A | | 7/1984 | Pauze | |
| 5,584,334 | A | | 12/1996 | Schink et al. | |
| 5,633,114 | A | | 5/1997 | Waterman | |
| 5,932,652 | A | * | 8/1999 | Roesler et al. | 524/839 |
| 6,171,769 | B1 | * | 1/2001 | Majumdar et al. | 430/529 |
| 2003/0129396 | A1 | | 7/2003 | Kiessling et al. | |

FOREIGN PATENT DOCUMENTS

| | | | |
|---|---|---|---|
| DE | 3139618 | A | 9/1982 |
| DE | 19841977 | A | 2/2000 |
| DE | 19811333 | A | 9/2000 |
| EP | 0521423 | A | 1/1993 |
| WO | WO 9641909 | A | 12/1996 |

OTHER PUBLICATIONS

"Hawley's Condensed Chemical Dictionary", 13th ed., Richard J. Lewis, Sr., ed. John Wiley & Sons, Inc., New York: 1997, pp. 906, 1076.*

* cited by examiner

*Primary Examiner*—James J. Seidleck
*Assistant Examiner*—Melanie Bissett
(74) *Attorney, Agent, or Firm*—Steven C. Benjamin

(57) ABSTRACT

An electrically conductive wire coated with a curable coating composition that forms a cured coating having a high partial discharge resitance and good mechanical properties. A process for coating an electrically conductive wire with a curable coating composition and curing the coating composition to form a coating having high partial discharge resistance and good mechanical properties.

11 Claims, No Drawings

COATING COMPOSITION FOR METALLIC CONDUCTORS AND COATING METHOD USING SAME

BACKGROUND OF THE INVENTION

The invention relates to a coating composition for metal conductors such as, for example, wires, with improved partial discharge resistance and good mechanical properties.

Three-phase a.c. motors, for example, frequency converter-controlled motors or high voltage asynchronous machines require the use of wire wrappings which satisfy the stringent requirements in respect of thermal endurance and the mechanical properties, mainly the flexural strength of the insulation layer, in order to be able to withstand high voltage loads and pulse-shaped voltage loads without damage.

A further requirement in respect of wire wrappings of electrical equipment is the partial discharge resistance of the wire coatings. Adjacent wire wrappings in particular may be exposed to high voltage loads and pulse-shaped voltage loads. For these purposes, the coatings must exhibit a high partial discharge resistance.

According to WO 96/41 909, within the context of a multi-layer coating for wires, a coating composition is used which comprises a binder and a particulate material, wherein the particulate material may be present in the binder in an amount from 1 wt. % to 65 wt. % and may be metal oxides, for example, titanium dioxide, zirconium oxide, zinc oxide, iron oxide or aluminas. The particulate material has no chemical reactivity whatsoever. During the manufacture of such coated wires, preliminary extension may occur which leads to destruction of the coating layers and hence to a drastic decrease in the partial discharge resistance.

Similar compositions with comparable properties are described in DE-A 198 32 186.

According to DE-A 196 50 288, at least one of the electrically insulating coating layers contains an organically modified silica (hetero)polycondensate prepared by hydrolytic condensation of compounds of silicon and optionally of boron, aluminum, phosphorus, tin, lead, the transition metals, lanthanides and actinides, the monomer units being composed essentially of inorganic and organic components which are substantially crosslinked. The coatings obtained have good thermal shock resistance and surface quality. Good flexibilities are not obtained.

In the as yet unpublished German patent application 198 11 333.1 of the same Applicant, a partial discharge-resistant coating is proposed which, in addition to binders, also contains element-organic compounds, particularly of silicon, germanium titanium and zirconium. The organic radicals used are C1 to C20 alkyl radicals or chelating radicals, alkylamine, alkanolamine, acetate, citrate, lactate and/or acetonate radicals. The organometallic compounds used are monomeric compounds.

In the as yet unpublished German application 198 41 977.5, inorganic-organic hybrid polymers are used. The transition from monomeric element-organic compounds to element-organic hybrid polymers leads to a further improvement in the partial discharge resistance of the coating layer in question.

For stringent requirements, particularly for three-phase a.c. motors in continuous operation and frequency converter-controlled motors, the partial discharge resistance obtained is still in need of improvement.

The object of the present invention is, therefore, to provide a coating composition for metal conductors, particularly wires, the partial discharge resistance of which is increased compared with the solutions of the prior art, particularly when the coated wire is extended. Moreover, the applicability of the coating composition as a single-layer application or as a coating in a multi-layer application, and the surface quality and flexibility of the coating should be improved.

SUMMARY OF THE INVENTION

It has become apparent that is object may be achieved by a coating composition which contains A) 1 wt. % to 60 wt. % of one or more reactive nanomers based on an element-oxygen network with elements of the series comprising aluminium, tin, boron, germanium, gallium, lead, the transition metals and the lanthanides and actinides, particularly of the series comprising silicon, titanium, zinc, yttrium, cerium, vanadium, hafnium, zirconium, nickel and/or tantalum, B) 0 wt. % to 90 wt. % of one or more conventional binders, and C) 0 wt. % to 95 wt. % of one or more conventional additives, solvents, pigments and/or filters.

wherein the reactive nanomer of component A is based on the element-oxygen network, on the surface of which reactive functions $R_1$ and optionally non-reactive and/or partially reactive functions $R_2$ and $R_3$ are bound by way of the oxygen of the network, $R_1$ being contained in an amount up to 98 wt. %, preferably up to 40 wt. %, particularly preferably up to 30 wt. %, $R_2$ and $R_3$ in an amount from 0 wt. % to 97 wt. %, preferably 0 wt. % to 40 wt. %, particularly preferably 0 wt. % to 10 wt. % in the nanomer according to the invention, in which $R_1$ represents radicals of the metal acid esters such as, e.g., $OTi(OR_4)_3$, $OZr(OR_4)_3$, $OSi(OR_4)_3$, $OSi(R_4)_3$; $OHf(OR_4)_3$; NCO; urethane, epoxide, epoxy, carboxylic acid anhydride; C═C double bond systems such as, e.g., methacrylate, acrylate; OH; alcohols bound by way of oxygen, e.g., bis(1-hydroxymethylpropane)-1-methylolate, 2,2-bis-(hydroxymethyl)-1-propanol-3-propanolate, 2-hydroxypropan-1-ol-3-olate, esters, ethers, e.g., 2-hydroxyethanolate, $C_2H_4OH$, diethylene glycolate, $C_2H_4OC_2H_4OH$, triethylene glycolate, $C_2H_4OC_2H_4OC_2H_4OH$; chelating agents, e.g., aminotriethanolate, aminodiethanolate, acetyl acetonate, ethyl acetoacetate, lactate; COOH; $NH_2$; $NHR_4$; and/or esters, reactive resin components such as, e.g., OH—, SH—, COOH—, NCO—, capped NCO—, $NH_2$—, epoxy, carboxylic acid anhydride, C═C, metal acid esters, silane-containing polyurethanes, polyesters, poly(THEIC) esters, poly (THEIC)ester imides, polyamide imides, polyamides, polysiloxanes, polysulfides, polyvinyl formals, polymers, e.g., polyacrylates.

$R_2$ represents radicals of aromatic compounds, e.g., phenyl, cresyl, nonylphenyl, aliphatic compounds, e.g., branched, linear, saturated, unsaturated alkyl radicals C1 to C30, fatty acid derivatives; linear or branched esters and/or ethers, $R_3$ represents resin radicals, e.g., polyurethane, polyester, polyester imide, THEIC-polyester imide, polytitanic ester resins and derivatives thereof; polysiloxane resins with organic derivatives; polysulfide, polyamide, polyamide imide, polyvinyl formal resins, and/or polymers such as, e.g., polyacrylates, polyhydrantoins, polybenzimidazoles, and $R_4$ represents radicals of acrylate, phenol, melamine, polyurethane, polyester, polyester imide, polysulfide, epoxide, polyamide, polyvinyl formal resins; aromatic compounds, e.g., phenyl, cresyl, nonylphenyl; aliphatic compounds, e.g., branched, linear, saturated, unsaturated alkyl radicals with C1 to C30; esters; ethers, e.g., methyl glycolate, methyl diglycolate, ethyl glycolate, butyl diglycolate, diethylene glycolate, triethylene glycolate; alcoholates, e.g., 1-hydroxymethyl-propane-1, 1-dimethylolate, 2,2-bis-(hydroxymethyl)-1,3-propane diolate, 2-hydroxypropane-1,3-diolate, ethylene glycolate, neopentyl glycolate, hexane diolate, butane diolate; fats, e.g., castor oil and/or chelating agents, e.g., aminotriethanolate, aminodiethanolate, acetyl acetonate, ethyl acetonacetate, lactate.

DETAILED DESCRIPTION OF THE INVENTION

The nanomer of component A) according to the invention is composed of an element-oxygen network on the surface of which the reactive functions $R_1$ and optionally non-reactive or partially reactive functions $R_2$ and $R_3$ are bound by way of the oxygen of the network. The nanomers with the described functions $R_1$ to $R_4$ are particles whose average radius is in the range from 1 nm to 300 nm, preferably in a range from 2 mm to 80 nm, particularly preferably in a range from 4 nm to 50 nm.

The nanomer according to the invention is contained in an amount from 1 wt. % to 60 wt. %, preferably 5 wt. % to 30 wt. %, in the coating composition.

The element-oxygen network of the nanomer according to the invention contains the above-mentioned elements which are bound by way of oxygen. The network may contain one or more identical or different elements in a regular and/or irregular sequence bound to the oxygen in each case.

The inorganic network preferably contains the elements of the series comprising titanium, silicon, aluminium and/or zirconium.

For example, compounds based on the products Nyacol DP 5480 from Nyacol Products Inc. may be used as component A).

Optionally, organic units such as, e.g., radical of aromatic compounds, aliphatic compounds, esters, ethers, alcoholates, fats and chelating agents, imides, amides, acrylates may also be implemented in the network of the nanomer according to the invention.

The use of $OTi(OR_4)_3$, $OZr(OR_4)_3$, acetyl acetonate, 2-hydroxyethanolate, diethylene glycolate, OH as function $R_1$ is preferred.

The use of radicals of polyester imides and/or THEIC polyester imide resins as function $R_3$ is preferred.

The use of acrylate resin, aminotriethanolate, acetyl acetonate, polyurethane resin and butyl diglycolate as function $R_4$ is preferred.

The radicals $R_1$ to $R_4$ in each case may be the same or different.

Examples of the nanomers of component A) which may be used according to the invention are shown in FIGS. 1 to 4.

FIG. 1 shows a nanomer which has OH groups as reactive function $R_1$. It is able, by way of these OH functions, to react with the corresponding functions of, for example, esters, carboxylic acids, isocyanates, epoxides, anhydrides and the like.

The reactivity of the nanomer according to FIG. 2 is determined by means of the OH functions as $R_1$ and the various resin sequences polyester imide and THEIC polyester imide as examples of $R_3$.

The nanomers according to FIGS. 3 and 4 are provided with ortho-titanic acid ester functions as reactive component $R_1$. The nanomer according to FIG. 4 also has a THEIC polyester imide as polymer fragment $R_3$.

The organic radicals Z stand for isopropyl, butyl, butyldiglycol, triethanolamine, acetyl acetone, polyamide imide, polyurethane and polyester imide groups and aminotriethanolate and epoxide groups, particularly selected from the group comprising $R_4$.

In addition to the nanomers of component A) used according to the invention, monomeric and/or polymeric element-organic compounds may be contained in the coating composition. Examples of polymeric element-organic compounds include inorganic-organic hybrid polymers as mentioned, for example, in the as yet unpublished German patent application 198 41 977.5. Examples of monomeric element-organic compounds include ortho-titanic acid esters and/or ortho-zirconic acid esters such as, for example, nonyl, cetyl, stearyl, triethanolamine, diethanolamine, acetyl acetone, acetonacetic acid esters, tetra-isopropyl, cresyl, tetrabutyl titanate or zirconate, and titanium tetralactate, hafnium and silicon compounds, e.g., hafnium tetrabutoxide and tetraethyl silicate and/or various silicone resins.

Additional polymeric and/or monomeric element-organic compounds of this kind may be contained in the composition according to the invention in an amount from 0 wt. % to 70 wt. %.

The preparation of component A) may take place by conventional hydrolysis and condensation reactions of appropriate element-organic or element-halogen compounds in the presence of organic reactants corresponding to functions $R_1$ to $R_3$.

Similarly, organic resin and/or nanomer components may be reacted with corresponding element-oxide compounds to the corresponding nanomers.

Such methods of preparation are known to the skilled person, see, e.g., Ralph K. Iler, John Wiley and Sons, "The Chemistry of Silica", New York, p. 312 ff, 1979.

The composition according to the invention may contain one or more binders as component B) of the kind known and customary in the wire coating sector. Examples include polyesters, polyester imides, polyamides, polyamide imides, THEIC polyester imides, polytitanic acid ester-THEIC ester imides, phenolic resins, melamine resins, polymethacrylamides, polyimides, polybismaleinimides, polyether imides, polybenzoxazine diones, polyhydantoins, polyfinyl formals, polyvinyl acetals and/or capped isocyanates. Further binders also include, e.g., epoxides and acrylate resins.

The use of polyesters and/or polyester imides, particularly THEIC-polyester imides is preferred.

Polyesters used may include, for example, those that are well known for wire coating. These may also be polyesters with heterocyclic, nitrogen-containing rings, for example, polyesters with imide and hydantoin and benzimidazole structures condensed into the molecule.

The polyesters include, in particular, condensation products of polyvalent, aliphatic, aromatic and/or cycloaliphatic carboxylic acids and anhydrides thereof, polyhydric alcohols, in the case of imide-containing polyester amino group-containing compounds optionally with a proportion of monofunctional compounds, for example, monohydric alcohols.

The saturated polyester imides are based preferably on terephthalic acid polyesters which, in addition to diols, may also contain polyols and, as an additional dicarboxylic acid component, a reaction product of diaminodiphenylmethane and trimellitic anhydride.

Moreover, unsaturated polyester resins and/or polyester imides may also be used. The use of unsaturated polyesters and/or polyester imides is preferred.

Moreover, polyamides may be used as component B), for example, thermoplastic polyamides and polyamide imides of the kind prepared from, e.g., trimellitic anhydride and isocyanotodiphenyl methane. Examples of phenolic resins and/or polyvinyl formals which may be used as component B) include novolaks obtainable by polycondensation of phenols and aldehydes, or polyvinyl formals obtainable from polyvinyl alcohols and aldehydes and/or ketones. Capped isocyanates may also be used as component B), such as, e.g., adducts of polyols, amines, CH-acid compounds (e.g., acetoacetic acid esters, malonic ester i.a.) and diisocyanates, cresols and phenols usually being used as capping agents.

The composition may contain pigments and/or fillers as component C), for example, colour-imparting inorganic and/or organic pigments such as titanium dioxide or carbon black, and special-effect pigments such as metal flake pigments and/or pearlescent pigments. Examples of additives contained include conventional pain additives, for example, extenders, plasticising components, accelerators (e.g., metal salts, substituted amines), initiators (e.g., photoinitiators, initiators which respond to heat), stabilisers (e.g., hydroquinones, quinones, alkyl phenols, alkyl phenol ethers), defoamers, levelling agents.

In order to increase solubility, the compositions may contain organic solvents such as, for example, aromatic hydrocarbons, N-methylpyrrolidone, cresols, phenols, xylenols, styrenes, vinyl toluene, methyl acrylates. The compositions according to the invention may contain, for example, 30 wt. % to 95 wt. % of organic solvents.

Optionally, the composition according to the invention may also be mixed with conventional wire coatings and then applied by conventional methods.

The application of the composition according to the invention may take place by conventional methods irrespective of the type and diameter of the wire used. The wire may be coated directly with the composition according to the invention and then stored in an oven. Coating and stoving may optionally take place several times in succession. The ovens may be arranged horizontally or vertically, the coating conditions such as duration and number of coatings, stoving temperature, coating speed depending on the nature of the wire to be coated. For example, the coating temperatures may be in the range from room temperature to 400° C. Moreover, ambient temperatures above 400° C., for example, up to 800° C. and above may also be possible during coating without any discernable deterioration in the quality of the coating according to the invention.

During the stoving process, the components of the composition according to the invention, particularly component A) and component B) may undergo a chemical reaction with one another. Depending on the chemical nature of components A) and B), various chemical reactions are possible, for example, transesterification reactions, polymerisation reactions, addition reactions, condensation reactions. According to the preferred use of components A) and B), condensation reactions may take place preferentially.

The use of the composition according to the invention may take place irrespective of the nature and diameter of the wire; for example, wires with a diameter from 5 $\mu$m to 6 mm may be coated. Suitable wires include conventional metal conductors, for example, of copper, aluminium, zinc, iron, gold, silver or alloys thereof.

The coating composition according to the invention may be contained as a constituent of a multi-layer according of the wire. This multi-layer coating may contain at least one coating composition according to the invention.

According to the invention, the wires may be coated with or without coatings already present. Existing coatings may include, for example, insulation coatings and flame retardant coatings. In such cases, the layer thickness of the coating according to the invention may differ considerably.

It is also possible to undertake further coatings by way of the coating according to the invention, for example, further insulation coatings. Such coatings may also be used, e.g., as a top coat for improved mechanical protection and for the creation of desired surface properties and for smoothing. For example, compositions based on polyamides, polyamide imides and polyimides are particularly suitable as top coats.

More particularly, the composition according to the invention is also suitable as a one-coat application.

According to the invention, the composition may be applied in conventional layer thicknesses. It is also possible to apply thin layers without affecting the partial discharge resistance obtained according to the invention, and the adhesion, strength and extensibility of the coatings. The dry layer thickness may vary in accordance with the standardised values for thin and thick wires.

The coatings obtained with the composition according to the invention permit an increased partial discharge resistance of the coating compared with the compositions known hitherto, as a result of which continuous loading under the effect of high voltages, particularly pulse-shaped voltages, becomes possible. They are characterised by a high continuous loading capability and a long service life compared with the coatings based on monomeric and/or polymeric element-organic compounds alone. The partial discharge resistance of the coated wires may be increase so that these are particularly suitable for use with high voltage loads and loads of pulse-shaped high voltages.

The invention is illustrated on the basis of the examples below:

Preparation of a Wire Coating According to the Prior Art

Example 1a (comparison)

261.2 g of tris-(2-hydroxyethyl)-isocyanurate (THEIC), 93.2 g of ethylene glycol, 194.2 g of dimethyl terephthalate (DMT) and 0.5 g of zinc acetate were heated to 210° C. within a period of 4 hours in a 2 liter three-necked flask with stirrer, thermometer and distillation unit. 60 g of methanol were distilled. After cooling to 150° C., 192.1 g of trimellitic anhydride (TMA) and 99.0 g of methylene dianiline (DADM) were added. The mixture was heated with stirring to 220° C. within a period of 3 hours and kept at this temperature for a further 3 hours. 33 g of water were distilled. The mixture was then cooled to 180° C. and 500 g of cresol were added.

With further stirring, a ready to use formulation of the resin solution present was prepared with 882.0 g of cresol, 273.0 g of Solvesso 100, 100.0 g of xylene, 9.0 g of a commercial phenolic resin A, 45.0 g of a commercial phenolic resin B and 18.0 g of ortho-titanic acid-tetrabutylester.

The resulting wire coating had a solids contents of 31.3% and a viscosity of 410 mPas.

Example 1b (comparison)

140 g of a particulate $SiO_2$ material according to WO 96/41 909 and 320 g of cresol were added to 1800 g of the wire coating according to Example 1a and stirred for 60 minutes. A coating dispersion with a solids content of 30.3% and a viscosity of 530 mPas was obtained.

Preparation of Wire Coatings According to the Invention

Example 2

200 g of "Nyacol DP5480" (Si—O nanomer with OH functions, 30% in ethylene glycol, nanomer radius: 25 nm, from Nycol Products Inc.) were added with vigorous stirring to 1800 g of the wire coating according to Example 1a and stirred for 60 minutes. A coating dispersion with a solids content of 30.9% and a viscosity of 390 mPas was obtained.

Example 3

400 g of "Nyacol DP 5480" were added with vigorous stirring to 1600 g of the wire coating according to Example 1 a and stirred for 60 minutes. A coating dispersion with a solids content of 30.6% and a viscosity of 370 mPas was obtained.

Example 4

In a 2 liter three-necked flask with stirrer, thermometer and distillation unit, 130.5 g of tris-(2-hydroxyethyl)-isocyanurate (THEIC), 62.0 g of ethylene glycol, 194.2 g of dimethyl terephthalate (DMT) were mixed thoroughly with 180.0 g of an OH-functional Si—O nanomer (average radius: 25 nm) prepared in the manner described by Ralph K. Iler, loc. cit., at 70° C. to 80° C. with vigorous stirring and then heated with 0.5 g of zinc acetate to 210° C. within a period of 4 hours. 60 g of methanol were distilled. After cooling to 150° C., 192.1 g of trimellitic anhydride (TMA) and 99.0 g of methylene dianiline (DADM) were added. The mixture was heated to 220° C. within a period of 3 hours, with stirring, and kept at this temperature for a further 3 hours. 33 g of water were distilled. The mixture was then cooled to 180° C. and 500.0 g of cresol were added.

With further stirring, a ready to use formulation of the resin solution present was prepared with 900.0 g of cresol, 284.5 g of Solvesso 100, 100.0 g of xylene, 9.2 g of a commercial phenolic resin A, 46.2 g of a commercial phenolic resin B and 18.4 g of ortho-titanic acid-tetrabutylester.

The resulting wire coating had a solids content of 30.8% and a viscosity of 380 mPas.

Example 5

In a 2 liter three-necked flask with stirrer, thermometer and distillation unit, 261.2 g of tris-(2-hydroxyethyl)-isocyanurate (THEIC), 93.2 g of ethylene glycol, 194.2 g of dimethyl terephthalate (DMT) and 0.5 g of zinc acetate were heated to 210° C. within a period of 4 hours. 60 g of methanol were distilled. After cooling to 150° C., 192.1 g of trimellitic anhydride (TMA) and 99.0 g of methylene dianiline (DADM) were added. The mixture was heating to 220° C. within a period of 3 hours, with stirring, and kept at this temperature for a further 3 hours. 33 g of water were distilled. The mixture was then cooled to 180° C. and 500 g of cresol were added. 45.0 g of ortho-titanic acid-tetra-isopropyl ester were added at 60° C. to 80° C. and, with vigorous stirring, 190.0 g of an OH-functional Al—O—Si—O nanomer (average radius: 20 nm) prepared in the manner described by Ralph K. Iler, loc. cit., and heated to 205° C. within a period of 5 hours, and 38.2 of isopropanol were distilled. After cooling and with further stirring, a ready to use formulation of the resin solution present was prepared with 1100.0 g of cresol, 355.0 g of Solvesso 100, 129.0 g of xylene, 11.0 g of a commercial phenolic resin A, 50.0 g of a commercial phenolic resin B.

The resulting wire coating had a solids content of 30.5% and a viscosity of 370 mPas.

Tests:

Solids content 1 g, 1 h, 180° C. [%]. DIN EN ISO 3251

Viscosity at 25° C. [mPas] or [Pas] DIN 53015

Application

Copper wires with a bare wire thickness of 0.3 mm were coated on a conventional wire coating plant with the wire coatings described according to Examples 2 to 5 and Comparison Examples 1a and 1b (single-layer coating). The resulting layer thickness was 18 μm.

TABLE 1

Technical data of the coated copper wires (according to DIN 46453 and DIN EN 60851)

| | Comparison Example 1a | Comparison Example 1b | Ex. 2 | Ex. 3 | Ex. 4 | Ex. 5 |
|---|---|---|---|---|---|---|
| Softening Point | 394° C. | 396 | 402° C. | 404° C. | 357° C. | 402° C. |
| Thermal shock l × d | 220° C. | 220° C. | 220° C. | 220° C. | 220° C. | 220° C. |
| Adhesion and extensibility during wrapping l × d | 25% | 10% | 20% | 15% | 20% | 15% |
| Pencil hardness | 3–4 H | 4–5 H | 6–7 H | 6–7 H | 6–7 H | 6–7 H |
| Paintability | Satisfactory | Satisfactory | Satis. | Satis. | Satis. | Satis. |
| Service life on converter* | 0.8 h | >1000 h | >1000 h | >1000 h | >1000 h | >1000 h |
| Service life on converter* | 0.5 h | 390 | 80 h | 420 h | 480 h | 430 h |
| With 5% pre-extension of coated wire | 0.3 h | 21 h | 70 h | 430 h | 490 h | 410 h |
| With 10% pre-extension of coated wire | 02 h | 13 h | 60 h | 430 h | 500 h | 430 h |

430 h *frequency converter from Siemens: Simovert P 6SE2103-3AA01

Output: 2.8 kVA, cycle frequency: 10 kHz

What is claimed is:

1. An electrically conductive wire coated with a curable coating composition, comprising:

(A) 1–60 wt. % of at least one reactive particle, said reactive particles having an average radius ranging from 1 nm to 300 nm, wherein said reactive particles are based on an element-oxygen network, and wherein the elements are selected from the group consisting of silicon, zinc, aluminum, tin, boron, germanium, gallium, lead, the transition metals, and lanthanides and actinides;

(B) 0–90 wt. % of at least one binder having at least one functional group capable of chemically reacting with the reactive particle of component (A); and (C) 0–95 wt. % of at least one additional component selected from the group consisting of additive, solvent, pigment and filler; wherein the total wt. % of (A)+(B)+(C) equals 100 wt. %;

wherein the element-oxygen network of said reactive particles has at least one reactive function $R_1$ and optionally at least one non-reactive and/or at least one partially reactive functions $R_2$ and $R_3$ bound by way of an oxygen of the element oxygen-network to the surface of said reactive particles, the reactive function $R_1$ being contained in an amount up to 98 wt. % of said reactive particles and the non-reactive and/or partially reactive functions $R_2$ and $R_3$ being contained in an amount from 0–97 wt. % of said reactive particles;

wherein $R_1$ comprises radicals selected from the group consisting of metal acid esters, NCO, urethane groups, epoxide groups, epoxy, carboxylic acid anhydride, C═C double bond systems, OH, alcohols bound by way of oxygen, alcohols bound by way of esters, alcohols bound by way of ethers, chelating agents, COOH, $NH_2$, $NHR_4$, and reactive resin components;

wherein $R_2$ comprises radicals selected from the group consisting of aromatic compounds, aliphatic compounds, fatty acid derivatives, esters, and ethers;

wherein $R_3$ comprises resin radicals;

wherein $R_4$ comprises radicals selected from the group consisting of acrylate, phenol, melamine, polyurethane, polyester, polyester imide, polysulfide, epoxide, polyamide, polyvinyl formal resins, aromatic compounds, aliphatic compounds, esters, ethers, alcoholates, fats, and chelating agents;

wherein said reactive particles of component A require the presence of the at least one binder of component B when the reactive function $R_1$ comprises radicals selected from the group consisting of metal acid esters, NCO, urethane groups, epoxide groups, epoxy, carboxylic acid anhydride, C═C double bond systems, OH, alcohols, bound by way of oxygen, alcohols bound by way of esters, alcohols bound by way of ethers, chelating agents, COOH, $NH_2$, and $NHR_4$;

whereby, after application and curing of the curable coating composition, the element-oxygen network becomes an inorganic-organic-oxygen network providing a cured coating with high partial discharge resistance.

2. The electrically conductive wire of claim 1, wherein the reactive function $R_1$ comprises radicals selected from the group consisting of $OTi(OR_4)_3$, $OZr(OR_4)_3$, acetyl acetonate, 2-hydroxyethanolate, and diethylene glycolate.

3. The electrically conductive wire of claim 1, wherein $R_3$ comprises radicals selected from the group consisting of polyester imides and THEIC polyester imides.

4. The electrically conductive wire of claim 1, wherein $R_4$ comprises radicals selected from the group consisting of acrylate resins, aminotriethanolate, acetyl acetonate, polyurethane resins, and butyl diglycolate.

5. The electrically conductive wire of claim 1, wherein the reactive particles of component (A) have a network of elements selected from the group consisting of titanium, aluminum, silicon, and zirconium bound to the oxygen of the element-oxygen network of said reactive particles.

6. The electrically conductive wire of claim 1, wherein the reactive particles of component (A) have an average radius of 2–80 nm.

7. The electrically conductive wire of claim 1, further comprising monomeric or polymeric element-organic compounds selected from the group consisting of orthotitanic acid ester, orthozirconic acid ester, titanium tetralactate, hafnium tetrabutoxide, tetraethyl silicate and silicone resins.

8. A process for coating the electrically conductive wire of claim 1 comprising the steps of applying a curable coating composition comprising (A) 1–60 wt. % of at least one reactive particle, said reactive particles having an average radius ranging from 1 nm to 300 nm, wherein said reactive particles are based on an element-oxygen network, and wherein the elements are selected from the group consisting of silicon, zinc, aluminum, tin, boron, germanium, gallium, lead, the transition metals, and lanthanides and actinides;

(B) 0–90 wt. % of at least one binder having at least one functional group capable of chemically reacting with the reactive particle of component (A); and (C) 0–95 wt. % of at least one additional component selected from the group consisting of additive, solvent, pigment and filler; wherein the total wt. % of (A)+(B)+C equals 100 wt. %;

wherein the element-oxygen network of said reactive particles has at least one reactive function $R_1$ and optionally at least one non-reactive and/or at least one partially reactive functions $R_2$ and $R_3$ bound by way of an oxygen of the element oxygen-network to the surface of said reactive particles, the reactive function $R_1$ being contained in an amount up to 98 wt. % of said reactive particles and the non-reactive and/or partially reactive functions $R_2$ and $R_3$ being contained in an amount from 0–97 wt. % of said reactive particles;

wherein $R_1$ comprises radicals selected from the group consisting of metal acid esters, NCO, urethane groups, epoxide groups, epoxy, carboxylic acid anhydride, C═C double bond systems, OH, alcohols bound by way of oxygen, alcohols bound by way of esters, alcohols bound by way of ethers, chelating agents, COOH, $NH_2$, $NHR_4$, and reactive resin components;

wherein $R_2$ comprises radicals selected from the group consisting of aromatic compounds, aliphatic compounds, fatty acid derivatives, esters, and ethers;

wherein $R_3$ comprises resin radicals;

wherein $R_4$ comprises radicals selected from the group consisting of acrylate, phenol, melamine, polyurethane, polyester, polyester imide, polysulfide, epoxide, polyamide, polyvinyl formal resins, aromatic compounds, aliphatic compounds, esters, ethers, alcoholates, fats, and chelating agents;

wherein said reactive particles of component A require the presence of the at least one binder of component B when the reactive function $R_1$ comprises radicals selected from the group consisting of metal acid esters, NCO, urethane groups, epoxide groups, epoxy, carboxylic acid anhydride, C═C double bond systems, OH, alcohols bound by way of oxygen, alcohols bound by way of esters, alcohols bound by way of ethers, chelating agents, COOH, $NH_2$, and $NHR_4$; and curing said coating composition at an elevated temperature to produce a cured coating;

whereby, after applying and curing the curable coating composition, the element-oxygen network becomes an inorganic-organic-oxygen network providing the cured coating with high partial discharge resistance.

9. The process according to claim 8, wherein the electrically conductive wire is pre-coated.

10. A process according to claim 8, wherein the coating composition is applied as a single-layer.

11. A process according to claim 8, wherein the coating composition is applied as a base coat, middle coat, and/or top coat.

* * * * *